United States Patent [19]
Spriester et al.

[11] Patent Number: 6,130,703
[45] Date of Patent: Oct. 10, 2000

[54] LOCAL STATUS MONITORING OF TAPS IN A CABLE TELEVISION SYSTEM

[75] Inventors: Bart F. Spriester, Duluth; Sou-Pen Su; Joel P. Jenkins, both of Lawrenceville, all of Ga.

[73] Assignee: Scientific-Atlanta, Inc., Norcross, Ga.

[21] Appl. No.: 09/021,712

[22] Filed: Feb. 10, 1998

[51] Int. Cl.$^7$ .............................. H04N 7/10; H04N 17/00
[52] U.S. Cl. ............................................. 348/6; 348/192
[58] Field of Search .................................... 348/6, 12, 13, 348/192, 193; 455/3.1, 5.1, 6.1, 4, 70; 324/133, 542; 340/638, 641, 642, 654, 652; 379/32, 29, 7; 358/86, 114

[56] References Cited

U.S. PATENT DOCUMENTS

| | | |
|---|---|---|
| 3,333,188 | 7/1967 | Eagle . |
| 3,469,190 | 9/1969 | Rheinfelder ............................ 358/86 |
| 3,960,428 | 6/1976 | Naus et al. ........................... 339/90 R |
| 4,020,308 | 4/1977 | Edwards, Jr. et al. ................. 200/310 |
| 4,152,643 | 5/1979 | Schweitzer, Jr. ....................... 324/120 |
| 4,367,557 | 1/1983 | Stern et al. ................................ 455/4 |
| 4,408,227 | 10/1983 | Bradley ................................. 358/139 |
| 4,418,424 | 11/1983 | Kawamoto et al. ........................ 455/4 |
| 4,605,958 | 8/1986 | Machnik et al. ........................ 358/84 |
| 4,677,467 | 6/1987 | Hayes .................................... 358/86 |
| 4,685,065 | 8/1987 | Braun et al. ........................... 364/485 |
| 4,810,898 | 3/1989 | Rocci et al. ........................... 307/115 |
| 4,910,791 | 3/1990 | Dickinson et al. ........................ 455/4 |
| 4,951,311 | 8/1990 | Sterr ..................................... 379/376 |
| 5,058,198 | 10/1991 | Rocci et al. ............................. 455/3 |
| 5,185,570 | 2/1993 | Fitzpatrick ............................. 324/133 |
| 5,341,216 | 8/1994 | Hoffart .................................... 348/1 |
| 5,353,327 | 10/1994 | Adari et al. ............................. 379/29 |
| 5,393,246 | 2/1995 | Du ........................................ 439/482 |
| 5,459,507 | 10/1995 | Sakuma et al. .......................... 348/10 |
| 5,473,361 | 12/1995 | Penney .................................... 348/6 |
| 5,528,684 | 6/1996 | Schneider et al. ...................... 379/399 |
| 5,541,586 | 7/1996 | Wise ................................. 340/825.79 |
| 5,555,015 | 9/1996 | Aguayo, Jr. et al. ...................... 348/6 |
| 5,574,495 | 11/1996 | Caporizzo ............................. 348/192 |
| 5,581,801 | 12/1996 | Spriester et al. ........................ 455/3.1 |
| 5,585,842 | 12/1996 | Chappell et al. ...................... 348/192 |
| 5,684,721 | 11/1997 | Swoboda et al. ....................... 364/578 |
| 5,754,112 | 5/1998 | Novak .................................... 340/687 |
| 5,790,523 | 8/1998 | Ritchie, Jr. et al. .................... 455/3.1 |
| 5,881,362 | 3/1999 | Eldering et al. ........................ 455/4.2 |
| 5,883,664 | 3/1999 | So ........................................ 348/192 |

*Primary Examiner*—Nathan Flynn
*Assistant Examiner*—Kieu-Oanh Bui
*Attorney, Agent, or Firm*—Kelly A. Gardner; Kenneth M. Massaroni; Hubert J. Barnhardt, III

[57] ABSTRACT

A tap (125) for use in a cable television system (100) includes an incoming port (202) for receiving an incoming signal from a head end section (105) and at least first and second outgoing subscriber ports (225, 230) for transmitting outgoing signals to system subscribers. The first and second subscriber ports (225, 230) can be enabled or disabled, depending upon whether cable service is to be provided from a particular port. The tap (125) also includes light sources (250, 260) located on the body of the tap (125) to indicate statuses, i.e., enabled or disabled, of the subscriber ports (225, 230).

23 Claims, 3 Drawing Sheets

100

125

125

LOCAL STATUS MONITORING OF TAPS IN A CABLE TELEVISION SYSTEM

FIELD OF THE INVENTION

This invention relates generally to cable television systems, and more specifically to monitoring of taps in such systems.

BACKGROUND OF THE INVENTION

Cable television (CATV) systems typically include a head end section that receives satellite signals and demodulates the signals to baseband. The baseband signal is then converted to an optical signal for transmission from the head end section, such as over fiber optic cable. CATV signals also include one or more nodes for converting the optical signal to a radio frequency (RF) signal for further transmission along branches that include coaxial cable rather than fiber optic cable. Taps are situated along the coaxial cable to tap off signals to subscriber premises.

Cable taps usually include a single incoming port for receiving the RF signal and multiple outgoing ports for providing signals to a plurality of locations. Typically, the number of outgoing ports on a tap is selected based on the number of possible subscribers in a given geographic area. For instance, a four-port tap can be placed geographically near four homes, even if not all of the homes currently receive cable signals. The ports on the tap can be activated remotely or locally, such as when a cable service person physically couples a coaxial cable from a previously inactive port to the home to activate the port. When remote activation is used, on the other hand, inactive ports can already be physically connected to homes or offices that do not currently subscribe. When the home or office is later to receive the cable signal, an operator generally directs the transmission of a signal to tap instructing the tap to enable a particular port, such as by providing an electrical connection to the selected port via a switch. As a result, a particular port can be activated without requiring a service person to visit the tap location.

However, current CATV systems do not provide any simple method for determining whether activation of a tap port has been successful. Instead, a cable technician must visit the tap site, disconnect the subscriber drop from a port, and use a spectrum analyzer to determine whether there is port activity. This method is time consuming, labor intensive, and involves interruption of service to the subscriber.

Thus, what is needed is an improved method for monitoring the status of a tap located remotely from the head end section of a CATV system.

DETAILED DESCRIPTION OF A PREFERRED EMBODIMENT

Figure 1:
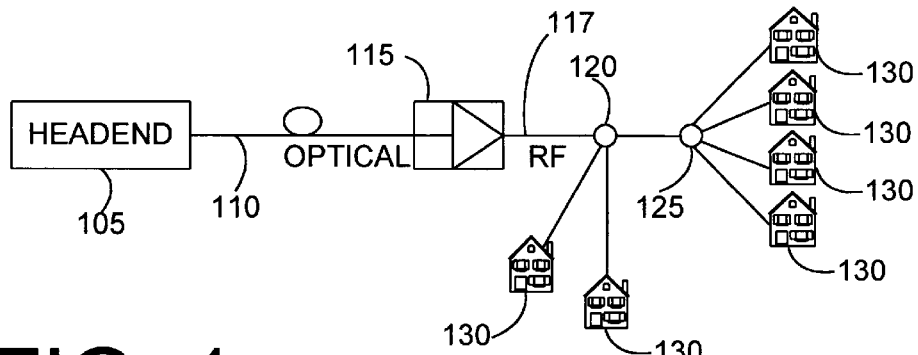
FIG. 1 is a diagram of a cable television (CATV) system according to the present invention.

Referring to FIG. 1, a cable television (CATV) system 100 is shown. The CATV system 100 includes a head end section 105 for receiving satellite television signals, demodulating the signals down to baseband, and transmitting the signals over the CATV system 100. The transmitted signals can, for instance, be radio frequency (RF) signals, although they are more preferably optical signals that are transmitted over a communication medium such as fiber optic cable 110. When optical signals are transmitted by the head end section 105, one or more nodes 115 are included in the system 100 for converting the optical signals to RF signals which are thereafter routed over other communication media, such as coaxial cables 117. As mentioned briefly in the Background of the Invention, taps 120, 125 are provided within the CATV system 100 for splitting the RF signal off to system subscribers 130. More particularly, each tap 120, 125 receives an incoming signal at an incoming port and routes the signal to a subscriber via an outgoing port that has been previously enabled to forward the signal. Each tap 120, 125 can include various numbers of outgoing ports, depending upon the number of system subscribers to be coupled to the tap 120, 125. For example, when eight subscribers can be possibly coupled to a particular tap, that tap includes eight outgoing "subscriber" ports, as well as the main outgoing port that routes the cable signal to further devices within the CATV system 100.

Subscriber ports of a tap 120, 125 are either disabled, so that a signal is not transmitted from that port, or enabled for transmission. A subscriber port of a tap 120, 125 can, for instance, be manually enabled, such as when a cable service person physically visits the tap location to connect a cable from a system subscriber to the port, thereby activating cable service. Newer CATV systems 100 can also include addressable taps, subscriber ports of which can be enabled and disabled through the use of programming signals sent from the head end section 105 over the communication media 110, 117 to a tap 120, 125. In this case, the head end section 105 typically includes a programming section that provides the programming signals in response to prompts entered by a human operator. It will be appreciated that the main outgoing port of the tap 120, 125 typically remains active at all times.

Figure 2:
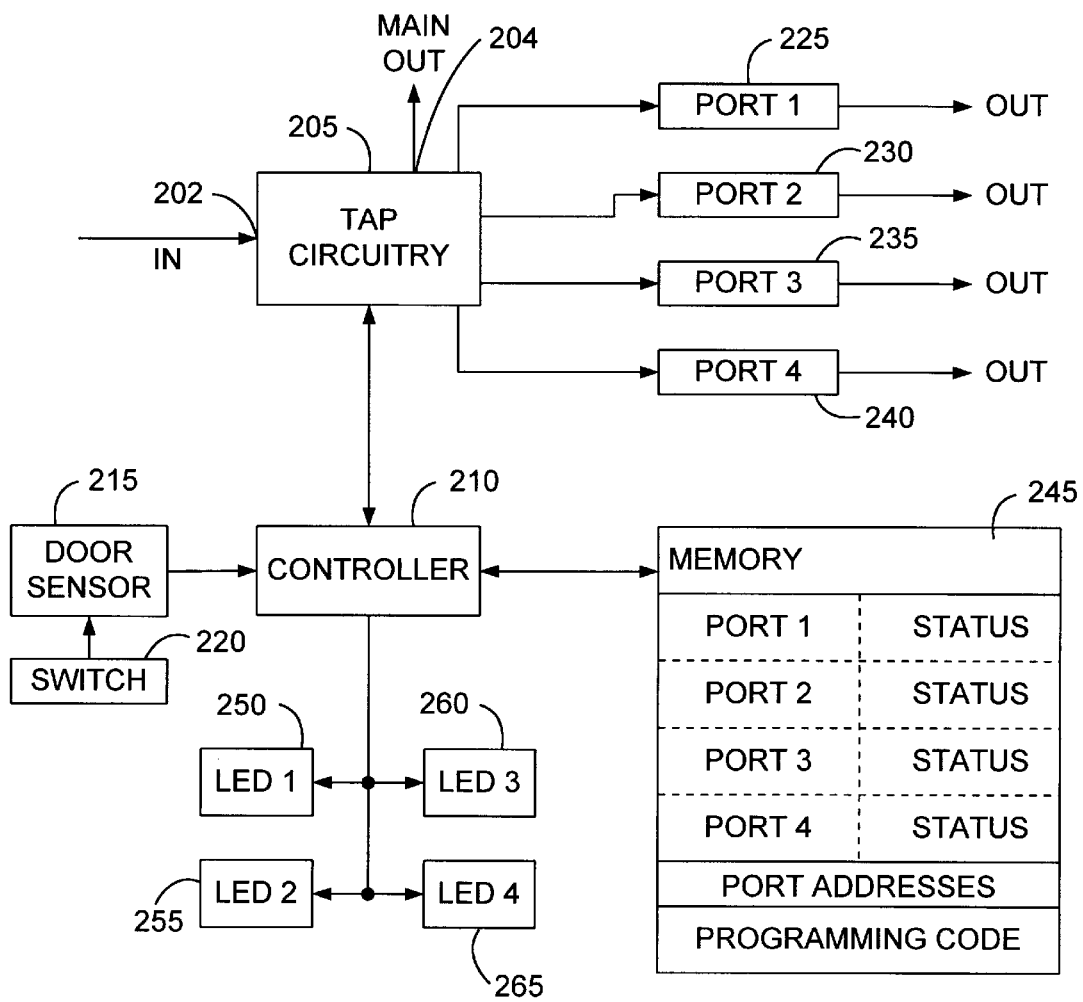
FIG. 2 is an electrical block diagram of a tap included in the CATV system of FIG. 1 according to the present invention.

FIG. 2 is an electrical block diagram of a tap 125 included in the CATV system 100. As previously described, the tap 125 includes an incoming port 202 for receiving an incoming signal, a main outgoing port 204 for continued routing of the signal, and outgoing subscriber ports 225, 230, 235, 240 for providing outgoing signals to subscribers when enabled. The incoming signal can be processed by tap circuitry 205 in a conventional manner to provide outgoing signals to enabled ones of the outgoing subscriber ports 225, 230, 235, 240. The tap 125 further includes a controller 210 coupled to the tap circuitry 205 for processing commands provided by the head end section 105 (FIG. 1) in the form of programming signals. Programming signals directed to the tap 125 can be recognized by reception of a known address and a programming code within an incoming signal. When, for instance, a particular port is to be enabled, the incoming signal can include the subscriber port address and a programming code indicative of the desired function. Alternatively, a programming signal could include a general tap address, the programming code, and a port number corresponding to the subscriber port to be enabled. The controller 210 then directs the tap circuitry 205 to close a switch (not shown) coupled to the selected port, thereby enabling the port. When, on the other hand, a subscriber port is to be disabled, the controller 210, in response to the appropriate programming signal, directs the tap circuitry 205 to electrically open a switch, thereby decoupling the subscriber port from the outgoing signal.

A memory 245 is also included in the tap 125 for storing operational parameters, such as the subscriber port addresses (or a general tap address and port codes, values, or other indicators) and any programming codes, and indications of the statuses of the outgoing subscriber ports 225, 230, 235, 240. The status information can, for example, be indicated by bits set to particular values, e.g., ones or zeros, or other recognizable codes. In response to activation or deactivation of a port, the controller 210 preferably sets the status information corresponding to the activated port to indicate its updated status in the memory 245.

According to the present invention, local status monitoring of subscriber ports on the tap 125 is available via a display device that visually indicates subscriber port status information. The display device could be, for instance, a liquid crystal display that indicates an on/off status for each subscriber port, such as by numbers or pictorially. In its simplest form, the display device can comprise a plurality of light sources, such as light emitting diodes (LEDs) 250, 255, 260, 265, located on the body of the tap 125. By way of example, in a four-port device as shown, four LEDs 250, 255, 260, 265 could be located on the exterior of the tap 125. Each LED could correspond to a single outgoing port so that activation, e.g., illumination, of the LED indicates that the corresponding port has been enabled. Alternatively, different types of visual indicators or merely different numbers of LEDs could be used as long as known information is used to indicate statuses of the various subscriber ports.

The local status monitoring provided by the present invention conveniently permits service personnel to easily determine port status by examining the tap 125 itself. As a result, time consuming testing to determine signal output can be minimized or even avoided altogether, thus saving time and money for the owners of the cable television equipment. Additionally, service to a subscriber need not be interrupted to determine port status.

Figure 3:
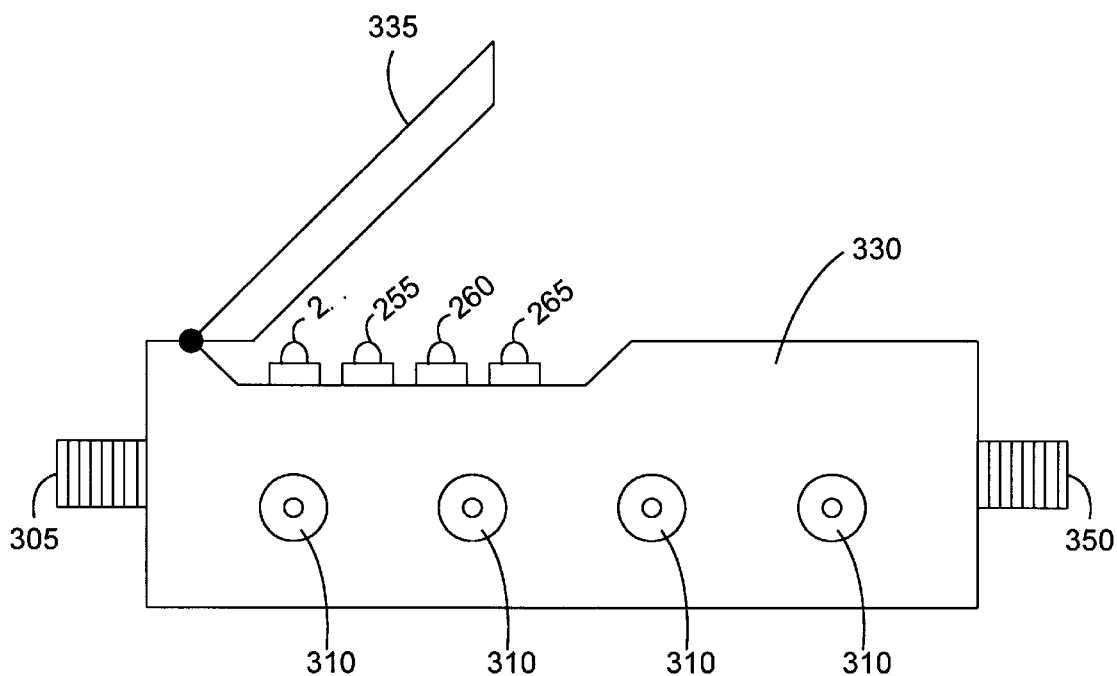
FIG. 3 is a side view of the tap of FIG. 2 according to the present invention.

Continuous activation of the status display mechanism, e.g., the LEDs 250, 255, 260, 265, could require a large amount of current, thereby draining a local power source (not shown). Therefore, a sensor 215 is provided to indicate to the controller 210 when status information is to be displayed to a technician. This can be done in a number of ways, such as by requiring the technician to push a button (not shown) to activate the LEDs. Referring to FIG. 3 in conjunction with FIG. 2, another method for causing selective activation of the LEDs is illustrated.

In FIG. 3, a side view of the tap 125 and the LEDs 250, 255, 260, 265 is shown. The tap 125 includes a main body portion 330 on which an incoming connector 305, a main outgoing connector 350, and outgoing subscriber connectors 310 are mounted for routing signals. Additionally, the LEDs 250, 255, 260, 265 can be mounted on the main body portion 330. The tap 125 further includes a door 335 or other covering that is moveably mounted on the body portion 330 in a conventional manner. Preferably, the door 335 rotates between a closed position in which the LEDs 250, 255, 260, 265 are hidden from view and an open position, as shown, in which the LEDs 250, 255, 260, 265 are visible.

When the tap 125 includes a door 335 for covering the LEDs, the sensor 215 preferably signals the controller 210 only when the door 335 is open. This could be done by mounting a switch 220 (FIG. 4), such as a pin switch, on the body portion 330 of the tap 125 so that the switch 220 provides an open/closed indication to the sensor 215. It will be appreciated that other methods for indicating when the LEDs are to be activated could alternatively be used.

Figure 4:
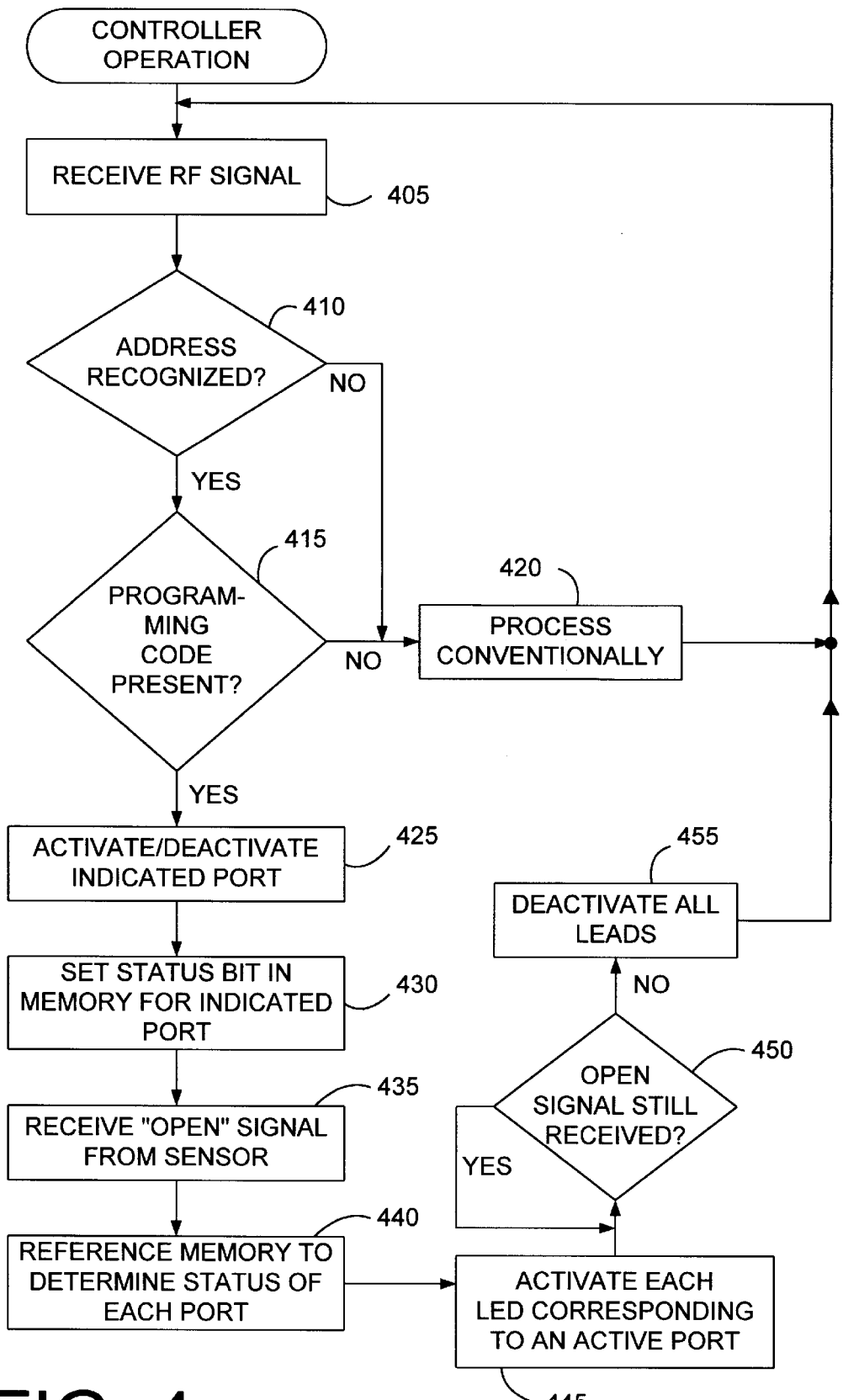
FIG. 4 is a flowchart illustrating an operation of a controller included in the tap of FIG. 2 according to the present invention.

Referring next to FIG. 4, a flowchart illustrates an operation of the controller 210. When, at step 405, the controller 210 receives an RF signal, it determines whether the a recognizable address is present, at step 410. When a known address is not present, the signal is processed, at step 420, in a conventional manner. When the tap is addressed properly, the controller 210 further determines whether any known programming code is present, at step 415. When no programming code is present, the signal is processed conventionally, at step 420. When a programming code indicates that a subscriber port of the tap 125 is to be enabled or disabled, the controller 210 proceeds to activate or deactivate the indicated port, at step 425. The controller 210 thereafter sets, at step 430, a status bit in the memory 245 to indicate the programmed subscriber port status. When, at step 435, the controller 210 receives an "open" signal from the sensor 215, the memory 245 is referenced, at step 440, to determine the status of each outgoing subscriber port. An LED corresponding to each enabled port is activated, such as by providing power thereto, to indicate the active status of the port, at step 445. Visual indications of the port status information can be provided for as long as the "open" signal is received, at step 450. When the "open" signal is no longer received, the LEDs are deactivated, at step 455, by the controller 210. It will be appreciated that the door 335 could be inadvertently left open by a technician. Therefore, the tap 125 could further include a timer (not shown) that is reset upon opening of the door and that causes automatic deactivation of the LEDs after expiration of a predetermined time period to conserve power.

In summary, the cable television system described above includes a head end section, nodes for converting optical signals into RF signals, and taps for splitting the incoming RF signal into a plurality of signals, each of which is routed to a subscriber premises. Each tap includes an incoming port for receiving the RF signal and outgoing ports for routing the outgoing signals. The main outgoing port forwards the RF signal through the cable system, while outgoing subscriber ports connect the signal to subscriber drops. The outgoing subscriber ports can be either enabled for signal transmission or disabled so that a disabled port does not route the RF signal. According to the present invention, subscriber port status is locally indicated on the tap itself. This is preferably done visually, such as by activating a display or light sources corresponding to the different ports. Alternatively, although not described above, other methods of locally indicating subscriber port status could be used. For instance, a switch corresponding to each subscriber port could be included on the tap, and activation of each switch could cause emission of an audible tone indicative of port status. Furthermore, other status information could also be provided locally. More specifically, status indicators, such as displays or LEDs, could indicate information about data reception, data transmission, tap operation, or any other event that occurs at the tap.

Preferably, status information is only provided when a service technician is present. Therefore, a door can be provided to normally cover the status indicators, e.g., LEDs. When the door is opened, a sensor signals a tap controller, which activates the LEDs to indicate the statuses of the different outgoing subscriber ports. As a result, the technician can conveniently assess the operation of each port without requiring undue consumption of current by the status indicators.

It will be appreciated by now that there has been provided a way to provide local status monitoring of outgoing subscriber ports on a tap used in a cable television system.

What is claimed is:

1. A tap for use in a cable television system, the tap comprising:

an incoming port for receiving an incoming signal;

first and second outgoing ports for transmitting outgoing signals, wherein each of the first and second outgoing ports can be enabled for transmission of the outgoing signals or disabled to prevent transmission of the outgoing signals;

a memory for storing operational parameters of the tap, including a status of each of the first and second outgoing ports as either enabled or disabled;

a controller coupled to the first and second outgoing ports and to the memory for enabling and disabling the first and second outgoing ports and for automatically updating the statuses of the first and second outgoing ports in the memory in response to any status changes; and a display device coupled to the first and second outgoing ports for displaying the status of each of the first and second outgoing ports as either enabled or disabled.

2. The tap of claim 1, wherein the display device provides a visual indication of the status of the first and second outgoing ports.

3. The tap of claim 2, wherein the display device comprises first and second light sources for indicating, respectively, the status of the first outgoing port and the status of the second outgoing port.

4. The tap of claim 3, wherein the first light source is activated to indicate that the first outgoing port is enabled.

5. The tap of claim 3, further comprising:

a door for covering the first and second light sources, the door moveable between an open position, in which the first and second light sources are visible, and a closed position, in which the first and second light sources are not visible.

6. The tap of claim 5, wherein the first and second light sources respectively display the status of the first outgoing port and the status of the second outgoing port in response to the door being moved into the open position.

7. The tap of claim 3, wherein the controller controls activation of the first and second light sources.

8. The tap of claim 7, wherein:

the controller receives programming signals indicating whether one of the first and second outgoing ports is to be enabled or disabled.

9. The tap of claim 7, further comprising:

a door for covering the first and second light sources, the door moveable between an open position, in which the first and second light sources are visible, and a closed position, in which the first and second light sources are not visible.

10. The tap of claim 9, wherein the first and second light sources respectively display the status of the first outgoing port and the status of the second outgoing port in response to the door being moved into the open position.

11. The tap of claim 9, further comprising:

a sensor coupled to the door and the controller for signaling the controller when the door is in the open position, in response to which the controller references the memory and activates a light source corresponding to an enabled port.

12. The tap of claim 1, wherein the first and second outgoing ports comprise first and second subscriber ports for providing subscriber drops, and wherein the tap further comprises a main outgoing port for forwarding the incoming signal to further devices of the cable television system.

13. A tap for use in a cable television system, the tap comprising:

an incoming port for receiving an incoming signal;

first and second subscriber ports for transmitting outgoing signals, wherein each of the first and second subscriber ports can be enabled for transmission of the outgoing signals or disabled to prevent transmission of the outgoing signals;

a memory for storing operational parameters of the tap, including a status of each of the first and second subscriber ports as enabled or disabled;

a controller coupled to the first and second subscriber ports and to the memory for enabling and disabling the first and second outgoing ports and for automatically updating the statuses of the first and second subscriber ports in the memory in response to any status changes; and first and second light sources corresponding, respectively, to the first and second subscriber ports for indicating statuses of the first and second subscriber ports as either enabled or disabled.

14. The tap of claim 13, the controller coupled to the first and second subscriber ports and the first and second light sources controls activation of the first and second light sources to indicates statuses of the first and second subscriber ports.

15. The tap of claim 13, wherein, in response to any status change in a subscriber port, the controller updates the memory without human intervention.

16. The tap of claim 15, further comprising:

a door for covering the first and second light sources, the door moveable between an open position in which the first and second light sources are visible and a closed position in which the first and second light sources are not visible.

17. The tap of claim 16, wherein the controller references the memory and activates a light source corresponding to an enabled port in response to the door being in the open position.

18. The tap of claim 13, further comprising a main outgoing port for forwarding the incoming signal to further devices included within the cable television system.

19. A cable television system, including:

a head end section for transmitting cable television signals;

at least one tap coupled to the head end section, the at least one tap including:

an incoming port for receiving an incoming signal;

first and second subscriber ports for transmitting outgoing signals, wherein each of the first and second subscriber ports can be enabled for transmission of the outgoing signals or disabled to prevent transmission of the outgoing signals;

a memory for storing operational parameters of the at least one tap, including a status of each of the first and second subscriber ports as either enabled or disabled;

a controller coupled to the first and second subscriber ports and to the memory for enabling and disabling the first and second subscriber ports and for automatically updating the statuses of the first and second subscriber ports in the memory in response to any status changes;

a main outgoing port for forwarding the incoming signal to other devices of the cable television system; and first and second light sources corresponding, respectively, to the first and second subscriber ports for indicating statuses of the first and second subscriber ports as either enabled or disabled; and a communication medium coupled between the head end section and the incoming port of the at least one tap for providing the cable television signals thereto.

20. The cable television system of claim 19, wherein the controller coupled to the first and second subscriber ports and the first and second light sources controls activation of the first and second light sources to indicates statuses of the first and second subscriber ports.

21. The cable television system of claim 19, wherein, in response to any status change in a subscriber port, the controller updates the memory without human intervention.

22. The cable television system of claim 21, wherein the at least one tap further comprises:

a door for covering the first and second light sources, the door moveable between an open position in which the first and second light sources are visible and a closed position in which the first and second light sources are not visible.

23. The cable television system of claim 22, wherein the controller references the memory and activates a light source corresponding to an enabled port in response to the door being in the open position.

* * * * *

UNITED STATES PATENT AND TRADEMARK OFFICE
CERTIFICATE OF CORRECTION

PATENT NO : 6,130,703
DATED : October 10, 2000
INVENTOR(S) : Spriester et al.

It is certified that error appears in the above-identified patent and that said Letters Patent is hereby corrected as shown below:

Column 4, line 3, delete "the a" and insert therefore - a -
Column 6, line 26, delete "indicates" and insert therefore - indicate -
Column 7, line 11, delete "indicates" and insert therefore - indicate -

Signed and Sealed this

Twenty-second Day of May, 2001

Attest:

NICHOLAS P. GODICI

Attesting Officer     Acting Director of the United States Patent and Trademark Office